United States Patent [19]

Heidjann

[11] Patent Number: 4,739,774

[45] Date of Patent: Apr. 26, 1988

[54] SELF-PROPELLING HARVESTER THRESHER

[75] Inventor: Franz Heidjann, Harsewinkel, Fed. Rep. of Germany

[73] Assignee: Claas OHG, Harsewinkel, Fed. Rep. of Germany

[21] Appl. No.: 845,708

[22] Filed: Mar. 27, 1986

[30] Foreign Application Priority Data

Apr. 1, 1985 [DE] Fed. Rep. of Germany ....... 3511913

[51] Int. Cl.⁴ .............................................. A01F 7/04
[52] U.S. Cl. .................................. 130/27 T; 56/14.6; 130/27 AB
[58] Field of Search ............ 56/14.6; 130/27 T, 27 R, 130/27 AB, 27 M, 22 A

[56] References Cited

U.S. PATENT DOCUMENTS

| 4,149,360 | 4/1979 | Rowland-Hill | 56/14.6 |
| 4,254,780 | 3/1981 | Powell et al. | 56/14.6 X |
| 4,282,703 | 8/1981 | Wilson et al. | 130/27 T |
| 4,367,757 | 1/1983 | Claas | 56/14.6 X |
| 4,492,237 | 1/1985 | Pakosh | 56/14.6 X |
| 4,528,992 | 7/1985 | Heidjann | 56/14.6 X |
| 4,663,921 | 5/1987 | Hagstrom et al. | 56/14.6 |

FOREIGN PATENT DOCUMENTS

| 0089628 | 9/1983 | European Pat. Off. | 56/14.6 |
| 0183870 | 6/1986 | European Pat. Off. | 56/14.6 |
| 2728162 | 12/1978 | Fed. Rep. of Germany | 130/27 R |
| 2144016 | 2/1985 | United Kingdom | 56/14.6 |

Primary Examiner—Stephen J. Novosad
Assistant Examiner—David J. Bagnell
Attorney, Agent, or Firm—Michael J. Striker

[57] ABSTRACT

A self-propelling harvester thresher includes a cutting device and a grain separating device positioned before the machine frame of the thresher and liftable and lowerable. Two transport units receiving a grain-straw chaff mixture from the separating device and transporting the same to a container on the machine frame are provided. Each transport unit is a screw conveyor having shovels at the feeding end and a sieve portion at the discharge end. Both transport units are positioned between the drive wheels of the thresher are parallel to each other and extend transversely of the grain separating device.

12 Claims, 5 Drawing Sheets

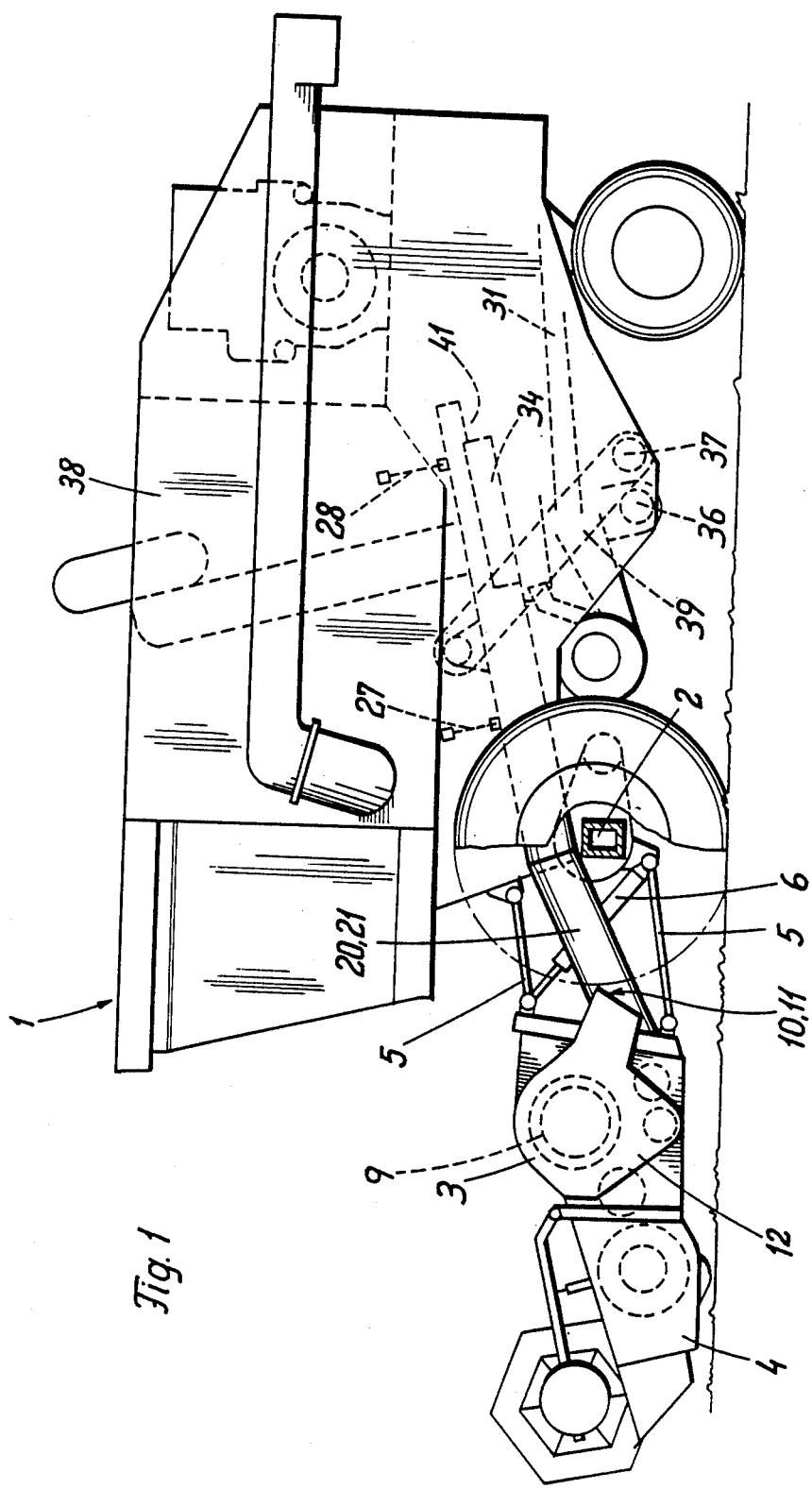

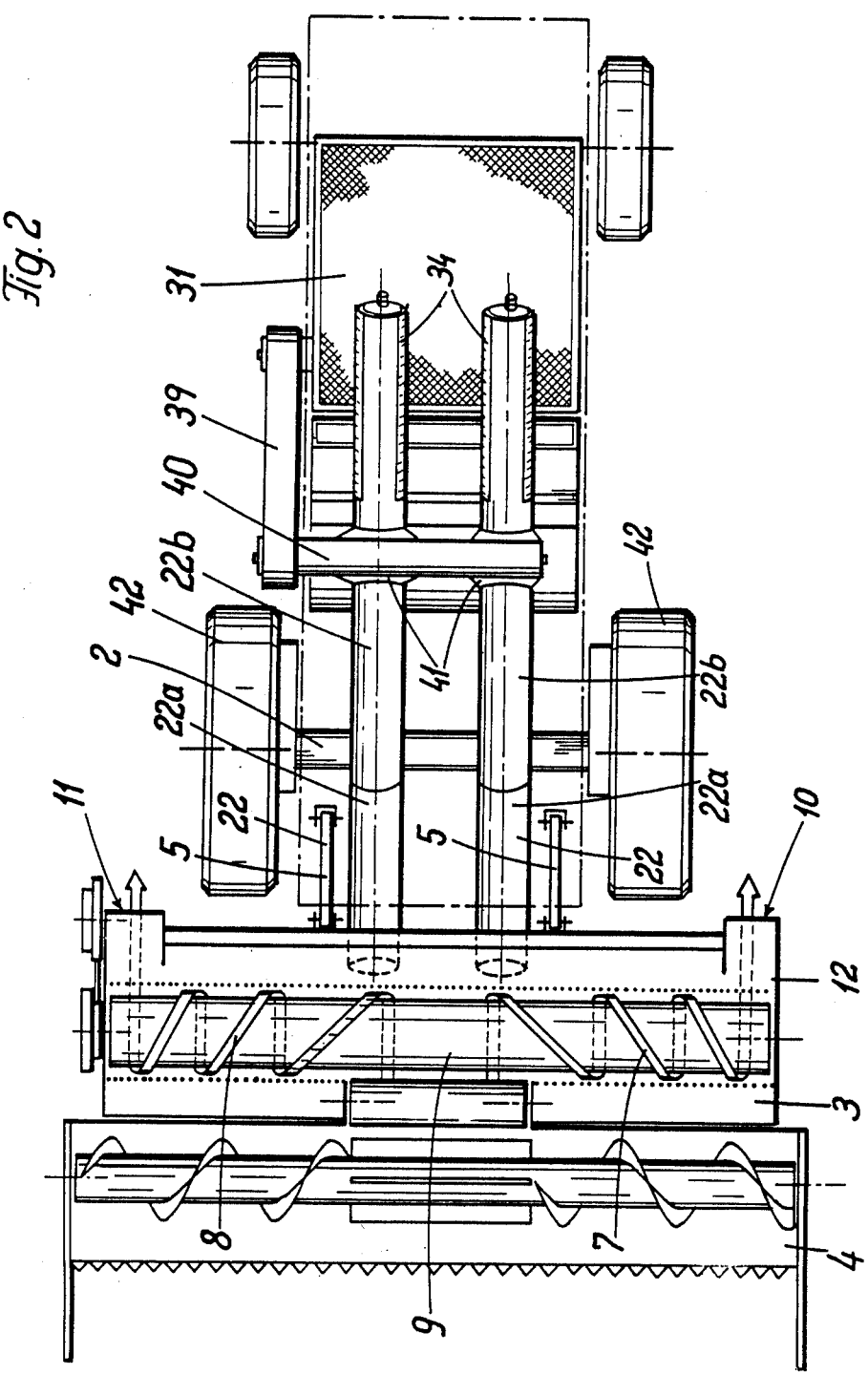

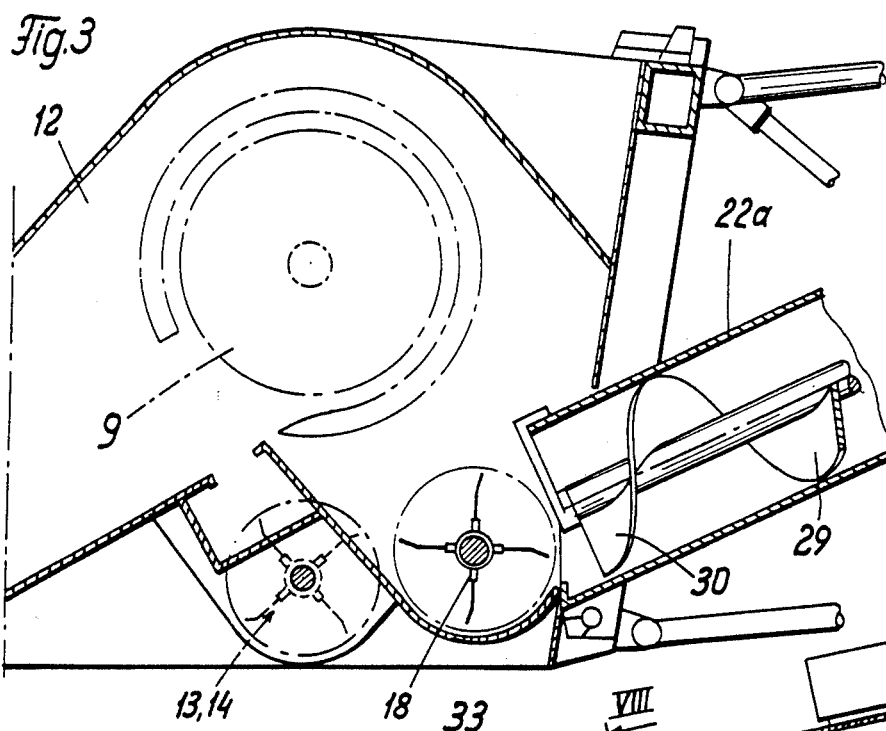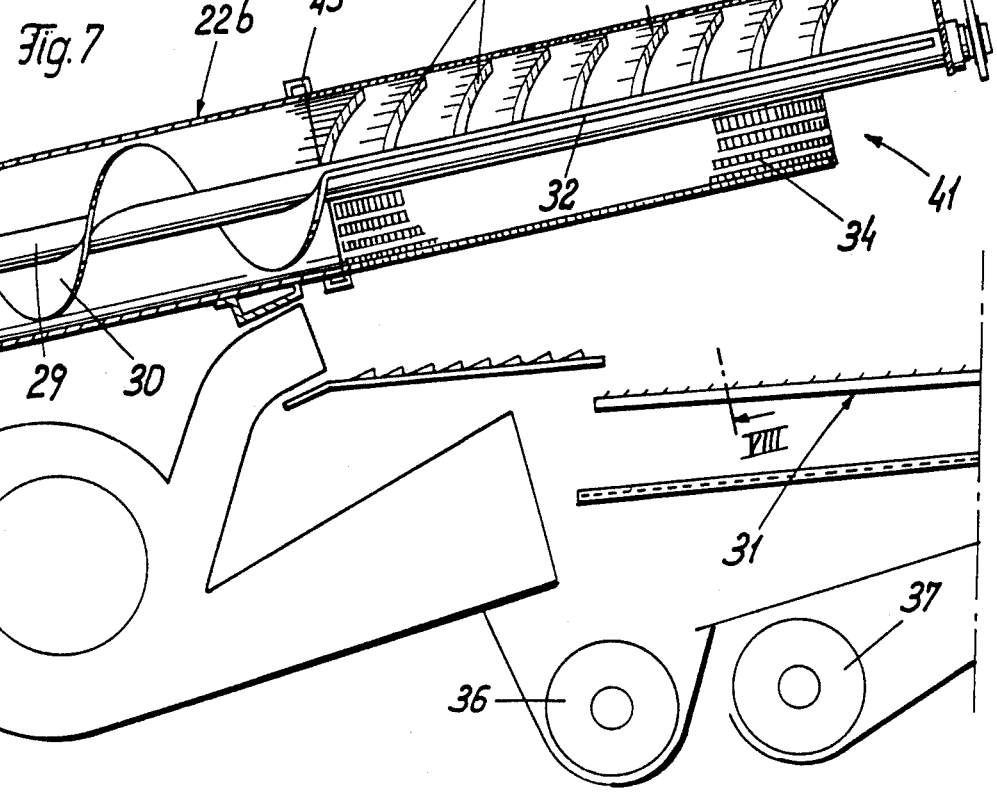

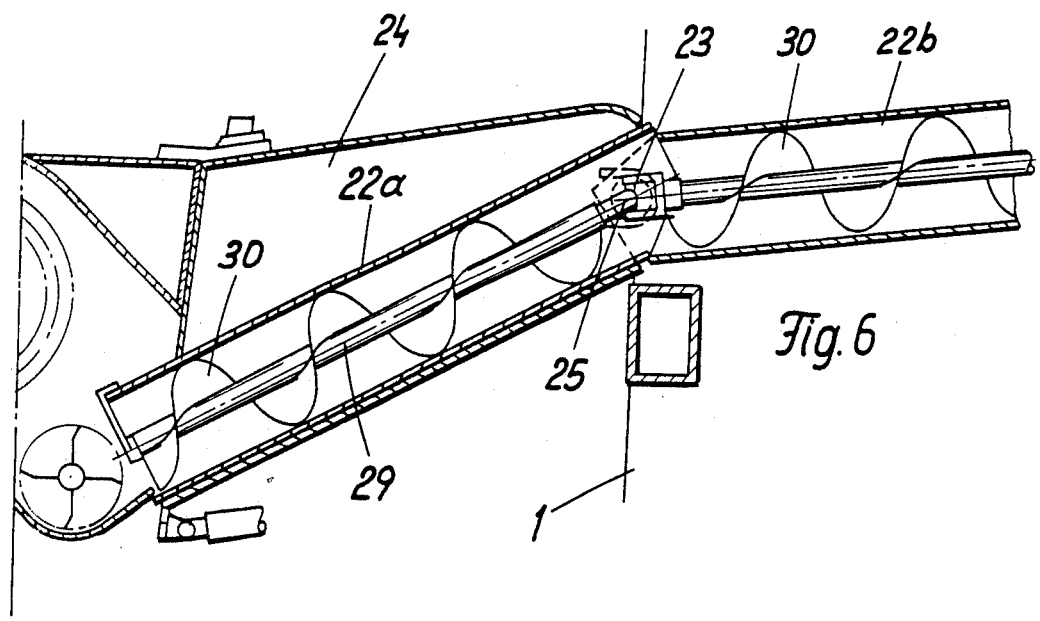
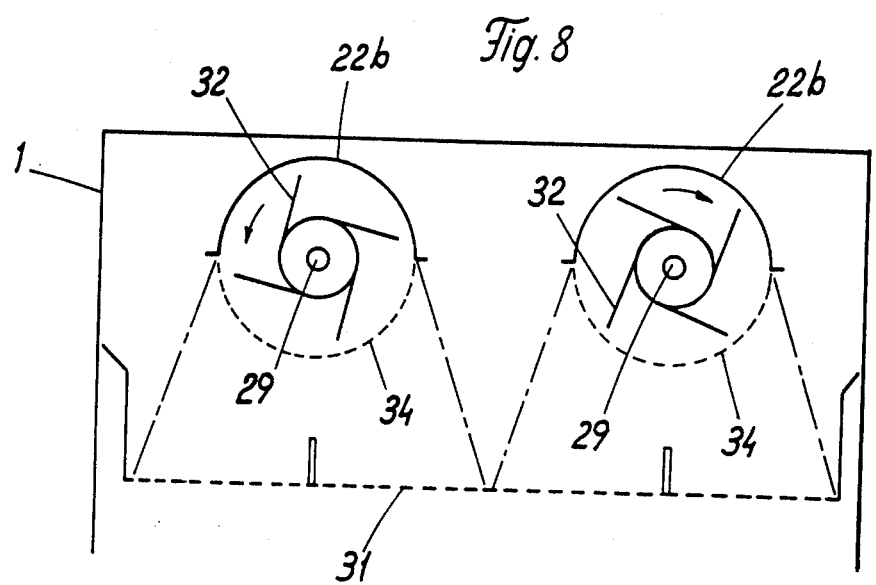

SELF-PROPELLING HARVESTER THRESHER

BACKGROUND OF THE INVENTION

The present invention relates to a self-propelling harvester thresher which normally includes a thresher frame with drive wheels, a cutting device, a device for threshing straw and separating the same from grain and a transport unit between the threshing device and the thresher frame carrying a container.

In harvester threshers of the type under consideration the axial threshing and separating device extends before the drive axis of the thresher and transversely of the direction of travel. The cutting device and the separating device are liftable and lowerable together while the transport unit receiving a grain-straw chaff mixture is provided with a flat sieve device.

The transport unit has a screw conveyor having shovels at the discharge end and a sieve-like bottom wall.

A harvester thresher of the foregoing type is disclosed in DE-OS 3,237,677. The thresher operates satisfactorily but it has been found that during the collecting of the crop, mechanical damage often occurs on a refining or cleaning device positioned on a carrier vehicle and due to collisions with, for example bushes or trees, a driver of the harvester thresher can be hurt. A further disadvantage of the conventional harvester thresher resides in that because of the lateral position of the cleaning device and because the center of gravity of the thresher is positioned off-center travelling along non-smooth or sloped farm land becomes troublesome.

SUMMARY OF THE INVENTION

It is an object of the present invention to provide an improved harvester thresher.

It is a further object of the invention to avoid above disadvantages of conventional harvester threshers of this type.

These and other objects of the invention are attained by a self-propelling harvester thresher, comprising drive wheels, a thresher frame, and axial threshing and separating device and a cutting device positioned before said thresher frame as seen in the direction of travel, the thresher having a drive axis extended traversely of said threshing and separating device, said separating device and said cutting device being liftable and lowerable together; and a transport unit provided with a flat sieve device and connected to said separating device and and operating for transporting a grain-straw chaff mixture, said transport unit including two transport devices each including a rotor, a tubular housing surrounding said rotor, said rotor being provided at a discharge region thereof with shovels, said tubular housing having guiding strips cooperating with said shovels and having a sieve bottom wall opposite to said guiding strips, said axial threshing and separating device having two opposite directions of feeding and operating so that the separated grain-straw chaff mixture is taken along by said separating device centrally thereof and is further passed over into at least one of said transport devices, said transport devices being positioned between said drive wheels, said separating device having a housing, said transport devices being interconnected between said housing and said thresher frame, each transport device having a discharge end which ends above or upstream of the blast-pressure sieve device.

The rotor of each transport unit may be formed as a screw conveyor which has a kink, formed as a hinge.

In order to ensure a rigid connection of the portion of each transport unit with the thresher the kink hinge axis and the pivot axis of the housing of the separating device lie on the same imaginary axis.

In order to obtain a greater rate of travel the transport devices are parallel to each other and each being assigned to a half of said threshing and separating device.

It is further advantageous that each transport device has a front-end feeding opening, said separating device having two winnowing-shovel conveyors each arranged before a respective front-end feeding opening.

The two winnowing-shovel conveyors may have a common axis.

In order to obtain good separation of grain from the grain-straw mixture in both transport devices even before the mixture enters the flat sieve device the sieve bottom wall of each transport device has sieve openings enlarging in a direction of flow of said mixture.

In accordance with a further feature of the invention the sieve openings are adjustable, and the sieve bottom wall of each transport device is releasably connected to the tubular housing of the transport device.

In customary harvester threshers, the cutting mechanism and the threshing and separating device are pivotally connected to the thresher frame by an inclined conveyer tunnel. Because the units of the thresher should be interchanged it is advantageous that the thresher includes an intermediate frame at which said threshing and separating device is pivotally connected to said thresher frame, said transport devices having feeding areas positioned at a portion of said intermediate frame.

The frame normally has the shape of the conventional inclined conveyor tunnel. In place of the such a frame the separating device may be connected to the thresher by steering arms. The advantage of such an arrangement resides in that independently from the vertical position of the cutting mechanism the relative position of this mechanism to the farm land remains stable.

The rotor of each transport device has a rotor shaft; the rotor shafts of the two transport devices may be driven in opposite directions.

In operation of the harvester thresher in hilly farm lands it would be advantageous if the feeding organs would be adjustable to such a land. For this purpose a rear portion of the tubular housing carrying the sieve bottom wall of each transport device may be connected to a front portion of the tubular housing by a rotatable ring to be able to rotate about an axis of elongation of the tubular housing.

The non-cleaned mixture may be fed back to said transport devices by means of reversing conveyors.

The rotor shafts of said transport devices may be driven at their discharge-side ends.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic side view of the harvester thresher with the structural units coupled to each other by steering arms;

FIG. 2 is a top plan view of the thresher of FIG. 1;

FIG. 3 is a sectional view of the portion of the thresher shown in FIG. 1 in dashed lines, but on enlarged scale;

FIG. 6 is a sectional view of the transport device shown in FIG. 4;

FIG. 7 is a sectional view of the dump-side of the transport device; and

FIG. 8 is a schematic view taken along line VIII—VIII of FIG. 7.

DETAILED DESCRIPTION OF THE PREFERRED EMBODIMENTS

Figure 4:
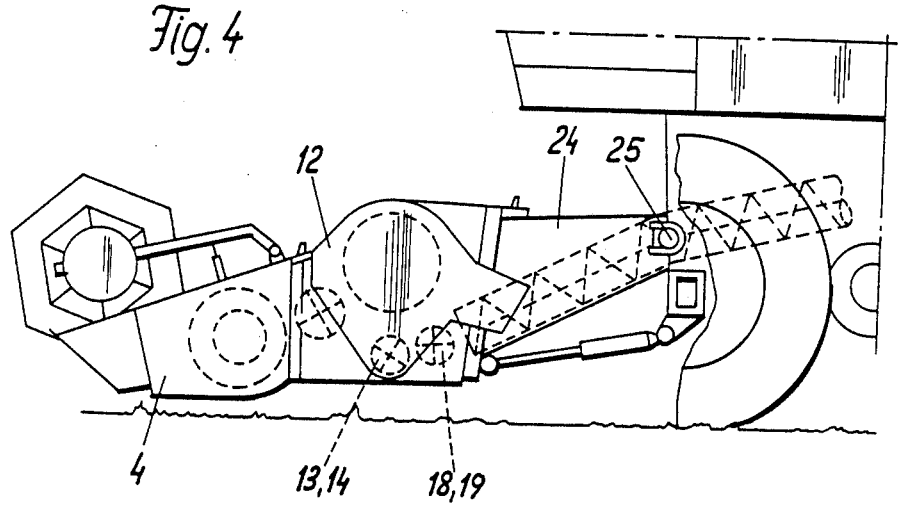
FIG. 4 is a side view of the front portion of the thresher with intermediate frames.

Referring now to the drawings in detail, and firstly to FIG. 1 thereof, reference numeral 1 designates the harvester thresher of the invention in total. The thresher has a driven shaft or axle 2 before which an axial threshing and separating device 3 carried by steering arms 5 is positioned. The threshing and separating device 3 is connected to a cutting mechanism 4. This cutting mechanism 4 and the threshing device 3 are liftable and lowerable in a parallel movement by means of a piston-cylinder unit 6. The axial threshing and separating device 3 is divided in the known manner centrally of the material flow being fed into two partial streams 7 and 8 (FIG. 2) whereby both partial material streams 7 and 8 extend on a rotor 9 spirally in the direction opposite to the direction of feeding. The threshed straw is then conveyed via two openings 10 and 11 of a housing 12 to a field ground whereas the grain-straw chaff mixture is fed onto the bottom of the housing 12.

Figure 5:
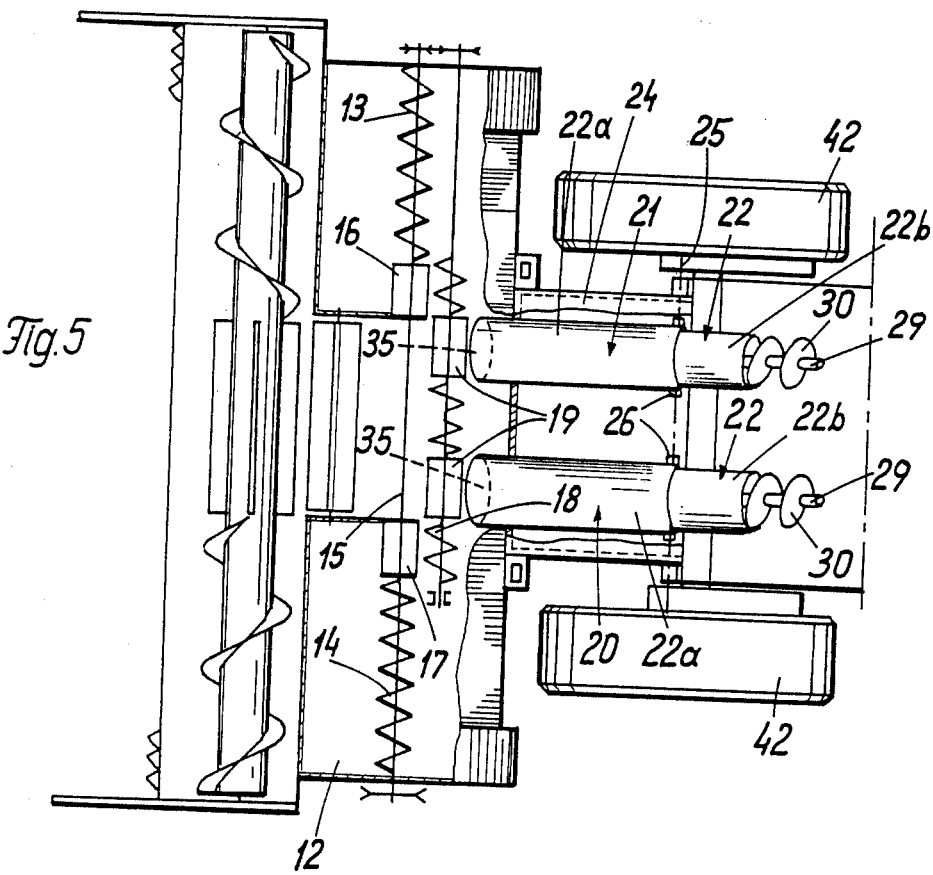
FIG. 5 is a top plan view of the front portion of the thresher shown in FIG. 4.

Two transverse screw conveyors 13 and 14 (FIGS. 3 and 4) are provided in the thresher, which conveyors have a common axle 15 (FIG. 5). The grain-straw shaff mixture is then fed through the two transverse screw conveyors 13 and 14 in the direction towards the middle of the device and is then transported by shovels 16 and 17 of a second transverse screw conveyor unit 18, positioned on the axle 15. The screw conveyor unit 18 forms a single unit with winnowing-shovel conveyors 19. The latter bring the grain-straw chaff mixture to two transport units 20 and 21; each transport unit includes a rotor housing 22 with a front-end feeding opening 35. The front portion 22a of the rotor housing 22 is pivotable relative to its rear portion 22b. In each rotor housing 22, a rotor shaft 29 is driven; rotor shaft 29 has a knee hinge 23, shown in FIG. 6, which is positioned in the region in which rotor housing portions 22a and 22b are pivotable relative to each other.

With reference to FIG. 4 it will be seen that in this embodiment the cutting mechanism 4 together with the axial threshing and separating device 3 are positioned on the harvester thresher 1 via intermediate frames 24 pivotable on pivot axes 25 on the frame of the thresher. The pivot axes 25, tubular pivot axes 26 and the axis of the knee hinge 23 lie in this embodiment on a common imaginary axis. The advantage of this embodiment resides in that the tubular housing portion 22b can be rigidly connected to the frame of the harvester thresher.

In the embodiment according to FIG. 1, the cutting mechanism 4 and the threshing and separating device 3 are connected to the main frame of the harvester thresher by steering arms 5 so that the cutting mechanism 4 in each vertical position maintains its relative position to the farm land. However, it is required in this case that the tubular housing portion 22b be connected to the harvester thresher 1 by levers 27 and 28 in order to compensate for relative movements between the harvester thresher 1 and the tubular housing portion during the change of the cutting mechanism 4. The transport units in these embodiments are identical. The rotor shaft 29 is provided over about two thirds of its length with a screw blade 30 as shown in FIG. 6. The screw blade 30 serves to transport the grain-straw chaff mixture. In the region of the tubular housing portion 22b which is positioned above the conventional flat sieve device 31, each rotor shaft 29 is equipped with shovels 32. These shovels are assigned to straw-guiding strips 33 secured in the upper portion of the tubular housing 22b as clearly shown in FIG. 7. At the side opposite to the straw-guiding strips 33, the tubular housing 22b is formed as a sieve bottom wall 34 of a circular cross-section. The width of the opening of this sieve bottom wall 34 in the direction of material flow in increased. At a discharge opening 41 short pieces of straw fall out from the tubular housing 29. The sieve cottom wall 34 of each tubular housing 22b is releasably connected thereto.

A final cleaning of the grain takes places on the flat sieve device 31 from which the cleaned grain is fed through the screw conveyor 36 and further known device into a grain container 38 whereas the non-cleaned material which is mixed with a small portion of straw is fed back to transport units 20, 21 by means of the reversing screw conveyor 37, and elevators 39 of the transverse conveyor device 40, which are connected by funnels 41 to both tubular housings 22.

As can be seen from FIG. 2 the transport units 20 and 21 are positioned so that they are covered or protected in the harvester thresher between two front drive wheels 42.

A rotating ring 43 connects two portions 22a and 22b of each tubular housing 22 so that they can be turned relative to each other.

It will be understood that each of the elements described above, or two or more together, may also find a useful application in other types of self-propelling harvester threshers differing from the types described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-propelling harvester thresher, comprising drive wheels; a thresher frame; an axial threshing-and-separating device; a cutting device, said threshing-andseparating device and said cutting device being both positioned before said thresher frame as seen in the direction of travel and separately from said thresher frame, the thresher having a drive axis extended transversely of said threshing-and-separating device, said threshing-and-separating device and said cutting device being liftable and lowerable together; and a transport unit provided with a flat sieve device and connected to said threshing-and-separating device and operating for transporting a grain-straw chaff mixture, said transport unit including two transport devices each including a rotor, a tubular housing surrounding said rotor, said rotor being provided at a discharge region thereof with shovels, said tubular housing having guiding strips cooperating with said shovels and a sieve bottom wall opposite to said guiding strips, said axial threshing-and-separating device having two opposite directions of feeding and operating so that the separated grain-straw chaff mixture is taken along by said threshing-and-separating device centrally thereof and is further passed over into at least one of said transport devices, said transport devices being positioned between said drive wheels, said threshing-and-separating device having a housing, said transport devices being interconnected between said housing and said thresher frame, each transport device having a discharge end which ends above said sieve device, the rotor of each transport unit being formed as a screw conveyor which has a kink, said transport unit having a kink axis in the region of the kink, said housing having a pivot axis, said kink axis and said pivot axis lying on the same imaginary line.

2. The thresher as defined in claim 1, wherein said transport devices are parallel to each other and each being assigned to a half of said threshing-and-separating device.

3. The thresher as defined in claim 2, wherein each transport device has a front-end feeding opening, said threshing-and-separating device having two winnowing-shovel conveyors each arranged before a respective front-end feeding opening.

4. The thresher as defined in claim 3, wherein two winnowing-shovel conveyors have a common axis.

5. The thresher as defined in claim 1, wherein the sieve bottom wall of each transport device has sieve openings enlarging in a direction of flow of said mixture.

6. The thresher as defined in claim 1, wherein the sieve bottom wall of each transport device is releasably connected to the tubular housing of the transport device.

7. The thresher as defined in claim 1; and further including a intermediate frame at which said threshing-and-separating device is pivotally connected to said thresher frame, said transport devices having feeding areas positioned at a portion of said intermediate frame.

8. The thresher as defined in claim 1, wherein said separating device is connected to the thresher frame by steering arms.

9. The thresher as defined in claim 1, wherein the rotor of each transport device has a rotor shaft, the rotor shafts of said two transport devices being driven in opposite directions.

10. The thresher as defined in claim 9, wherein the rotor shafts of said transport devices are driven at discharge-side ends.

11. The thresher as defined in claim 1, wherein a rear portion of the tubular housing carrying the sieve bottom wall of each transport device is connected to a front portion of the tubular housing by a rotatable ring to be able to rotate about an axis of elongation of the tubular housing.

12. The thresher as defined in claim 1, wherein a non-cleaned mixture is fed back to said transport devices by means of reversing conveyors.

* * * * *